United States Patent [19]
Allert

[11] Patent Number: 5,842,725
[45] Date of Patent: Dec. 1, 1998

[54] CLAMP AS WELL AS PIPE CONNECTION WITH A CLAMP

[75] Inventor: Kurt Allert, Oberndorf, Germany

[73] Assignee: Kurt Allert GmbH & Co. KG, Oberndorf, Germany

[21] Appl. No.: 731,868

[22] Filed: Oct. 21, 1996

[30] Foreign Application Priority Data

Oct. 19, 1995 [DE] Germany .................. 295 16 437.9

[51] Int. Cl.⁶ .................................................. F16L 35/00
[52] U.S. Cl. ............................... 285/114; 285/369; 24/279
[58] Field of Search ..................... 285/114, 420, 285/253, 417, 252, 369; 24/20 R, 279, 24

[56] References Cited

U.S. PATENT DOCUMENTS

| | | | |
|---|---|---|---|
| Re. 18,906 | 8/1933 | Mcguirk | 285/410 |
| 700,704 | 5/1902 | Parker | 285/410 |
| 1,093,868 | 4/1914 | Leighty | 285/420 |
| 2,166,524 | 7/1939 | Goodall | 285/253 |
| 2,273,210 | 2/1942 | Lowther et al. | 285/410 |
| 2,403,606 | 7/1946 | Meyer | 285/253 |
| 2,473,102 | 6/1949 | Krooss | 285/420 |
| 3,477,106 | 11/1969 | Tetzlaff et al. | 24/279 |
| 3,964,773 | 6/1976 | Stade et al. | 285/367 |
| 4,079,970 | 3/1978 | Brett | 285/420 |
| 5,018,768 | 5/1991 | Palatchy | 285/420 |
| 5,048,776 | 9/1991 | Weiss | 285/420 |
| 5,131,698 | 7/1992 | Calmettes et al. | 285/420 |

FOREIGN PATENT DOCUMENTS

| | | | |
|---|---|---|---|
| 0597805 | 5/1994 | European Pat. Off. | F16L 33/04 |
| 2207187 | 8/1973 | Germany . | |
| 2022680 | 12/1979 | United Kingdom | F16B 2/08 |
| 9511403 | 4/1995 | WIPO | F16L 23/08 |

*Primary Examiner*—Eric K. Nicholson
*Attorney, Agent, or Firm*—Darby & Darby

[57] ABSTRACT

The invention concerns a clamp having a band-shaped clamping section and a clamping device used to connect the end areas of the clamping sections, which each have a mounting flange extending at an angle to the respective clamping section end, whereby a clamping component acts on the two mounting flanges. It is provided that a reinforcing corner connection (14, 15) proceeds from each of the two lateral edges (12, 13) of each mounting flange (11), the reinforcing corner connection being connected with the respective lateral edge (16, 17) of the end area of the adjacent clamping section (18). Furthermore, the invention concerns a pipe connection having clamps of this type.

9 Claims, 3 Drawing Sheets

FIG. 3
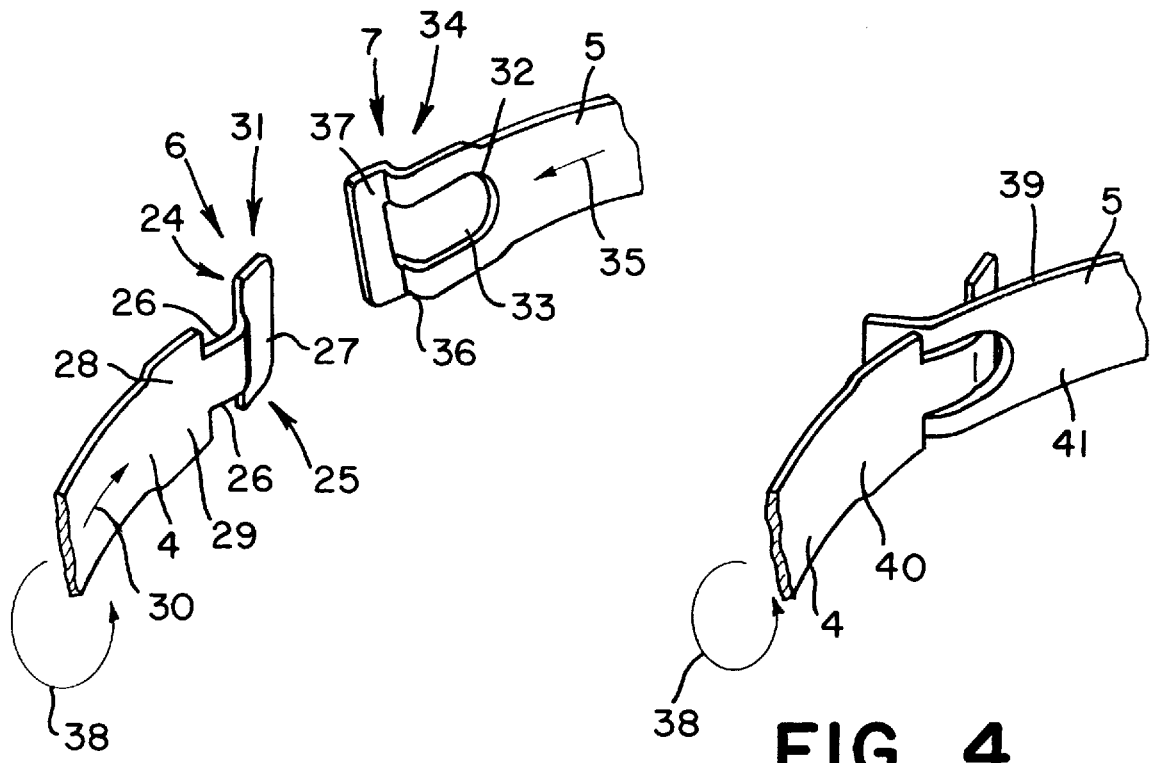
FIG. 4
FIG. 2
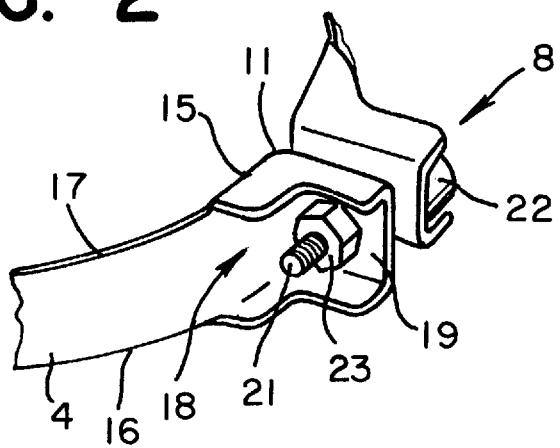

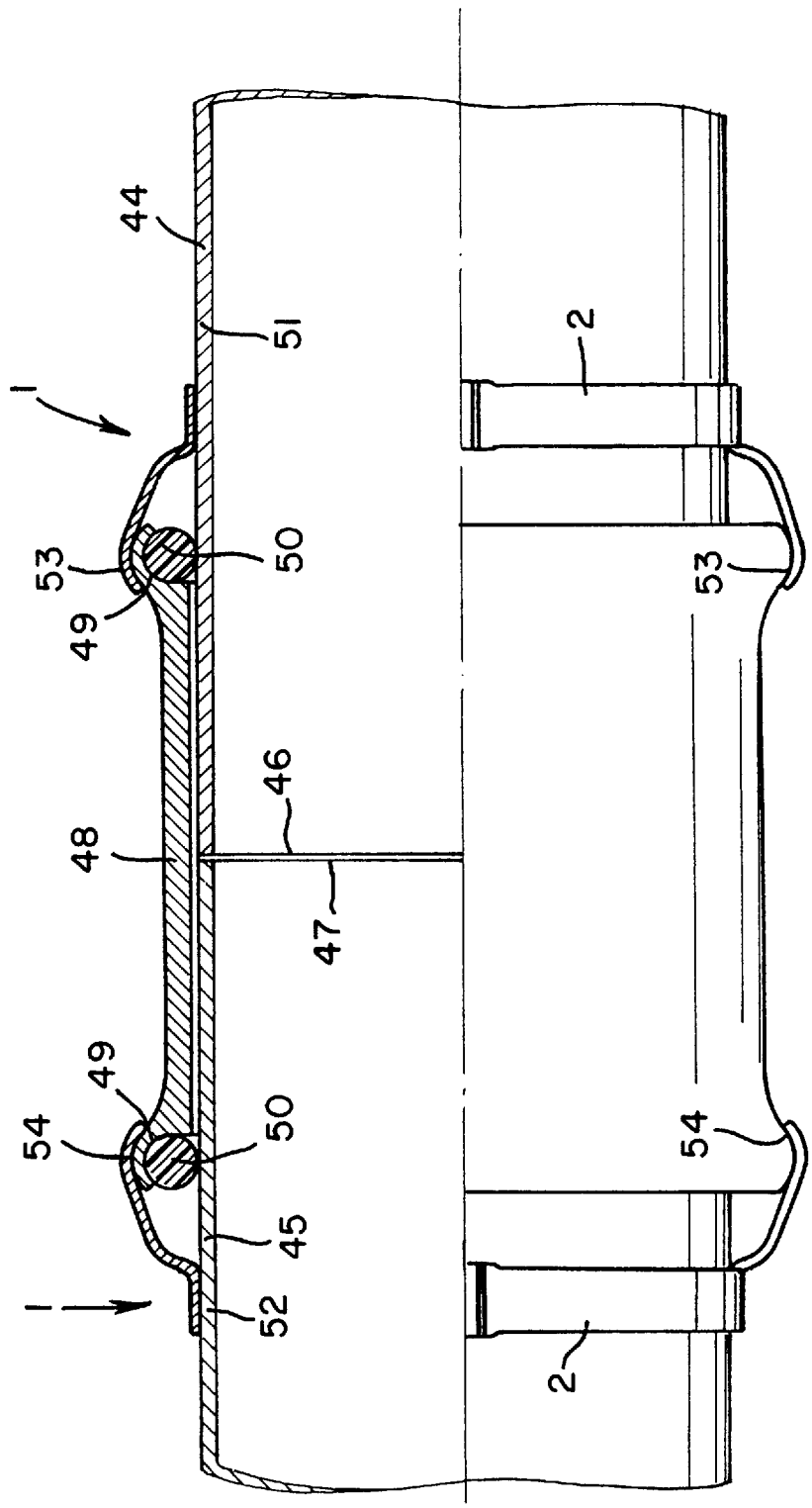

CLAMP AS WELL AS PIPE CONNECTION WITH A CLAMP

The invention concerns a clamp having a band-shaped clamping section and a clamping device used to connect the end areas of the clamping section, said clamping device having a mounting flange extending in an angular manner to each of the respective clamping section ends, whereby a clamping component acts on the two mounting flanges.

Clamps of this type are known. They are, for example, placed about pipes to secure hoses or the like pushed onto the pipes. The mounting flanges of these known clamps are formed thereby that a section of the band-shaped material is radially bent away from each of the clamping section ends. Two radially bent mounting flanges each face one another at a distance. They can be clamped shut by means of a clamping component, as a result of which the diameter of the clamp section is reduced, so that the clamp lies firmly about a corresponding object. The tensional forces of the known clamps are limited, so that there is an undersizing for certain tasks.

It is the object of the invention to provide a clamp of the aforementioned type with which very high tensional forces can be applied.

According to the invention, this object is solved thereby that a reinforcing corner connection proceeds from each of the two lateral edges of each mounting flange, said reinforcing corner connection being joined with the respective lateral edge of the adjacent clamping section end area. The reinforcing corner connections ensure that there is a highly solid connection between the respective clamping section end and the mounting flange, so that a deformation of the mounting flange, which extends in an angular manner to the clamping section end, is prevented to the greatest extent possible when tensional forces act on the mounting flange, since the reinforcing corner connections which proceed from each of the two lateral edges of the mounting flange and extend to the respective clamping section ends, form heavy duty structures. Therefore, the clamping component can exert very great forces on the mounting flange, whereby the mounting flanges do not give way or give way only slightly and, as a result, the full force is transmitted to the clamping section. The result is that a high surface pressure can be exerted on the enclosed object by means of the clamp of the invention.

According to a further embodiment of the invention, it is provided that the reinforcing corner connections are made as one piece with the respective mounting flange. In addition, it can be provided that the reinforcing corner connections are made as one piece with the respective end area of the clamping section. On the one hand, the one-piece design provides a very simple structure. Preferably, it is made by shaping operations, i.e. the entire clamp is punched out of sheet metal and the clamping device of the invention is thereby produced in one or more steps. On the other hand, a special mechanical stability of the mounting flange provided with reinforcing corner connections is attained due to the one-piece construction, since pocket-like forms are produced by the shaping processes (compression, stretching and so on) which are in themselves resistant to bending and torsion.

Furthermore, it is advantageous if the clamping component is a threaded screw, the screw shaft of which passes through a receiving opening of the respective mounting flange in each case, the head of which is supported on one of the mounting flanges and the shaft of which is screwed into a screw nut stayed on the other mounting flange. A clamping device having high tractive forces can be made herewith in a simple manner with inexpensive mass-produced components.

According to a further embodiment of the invention, it is provided that the clamping section is composed of several sections, preferably two, which are held together by form-locking elements such that they can be unhinged and moved. The advantage of this design is that, when installing and removing a clamp, for example, when mounting it on a pipe or when removing it from said pipe, the clamping section ends do not have to be bent apart so far to fit around the diameter of the pipe (as is the case in known clamps), but that it is possible to place it about the pipe or remove it from the pipe without elastic or plastic deformations due to its form-locking elements mounted vis-à-vis one another so as to be movable. Moreover, it is especially advantageous that the clamping sections are connected to one another such that they can be unhinged, i.e. they can be made in appropriate sections, so that the entire circumference (360°) of the clamp does not have to be made at the corresponding expense, but that smaller sections are made, for example clamp halves, which require simpler tools and are thus less expensive. The possibility of assembling the sections so as to be movable, on the one hand, and, on the other hand, to connect them together or separate them by unhinging by means of the form-locking elements, represents an advantageous double function.

According to a further embodiment of the invention, it is provided that one of the form-locking elements is formed by an opening in one of the parts and the other of the form-locking elements by a retaining projection of the other part which can be hooked into the opening. In particular, the retaining projection is made as one piece on the part in question. Moreover, the opening is preferably formed by an oblong hole extending in longitudinal direction of the clamping section. In particular, it is provided that the retaining projection is formed by a, in cross-section, T-shaped end area of the respective part. As a result, it is possible to insert the T-shaped leg of the retaining projection into the oblong hole by turning the two parts appropriately vis-à-vis one another and to then produce the form-locking by untwisting the two parts in the clamping plane. The oblong hole, as well as the construction of the T-shaped cross-section of the end area of the part, do not require any additional components or the like, but can be made by simple punching operations.

According to a further embodiment of the invention, it is provided that essentially axially extending retaining claws are arranged in the clamping section. These retaining claws are preferably made as one piece with the clamping section. In particular, they only proceed from one side of the clamping section. The retaining claws are used to axially secure components adjacent to the clamp. If, for example, the clamp is placed about a pipe which is connected with a further pipe by means of a socket, then the retaining claws serve to secure the relative position of pipe and socket.

Further, the invention concerns a pipe connection having two pipes, in particular sewer pipes, axially inserted into a pipe socket, whereby a clamp of the aforementioned type is fastened so as to be clamped on the pipes in each case and the retaining claws axially grip behind the rear grip edges of the clamp of the pipe socket. If, for example, an excess pressure is produced in the connected pipes, then the retaining claws prevent the pipe ends in the pipe socket from moving apart.

The drawings illustrate the invention with reference to an example of an embodiment, i.e.

FIG. 2 shows the clamp of FIG. 1 in the area of a clamping device,

FIG. 3 shows clamping section ends having form-locking elements of the clamp of FIG. 1, FIG. 4 shows a representation according to FIG. 3, but when hooked in position, and FIG. 5 shows a pipe connection with two clamps as per FIG. 1.

Figure 1:
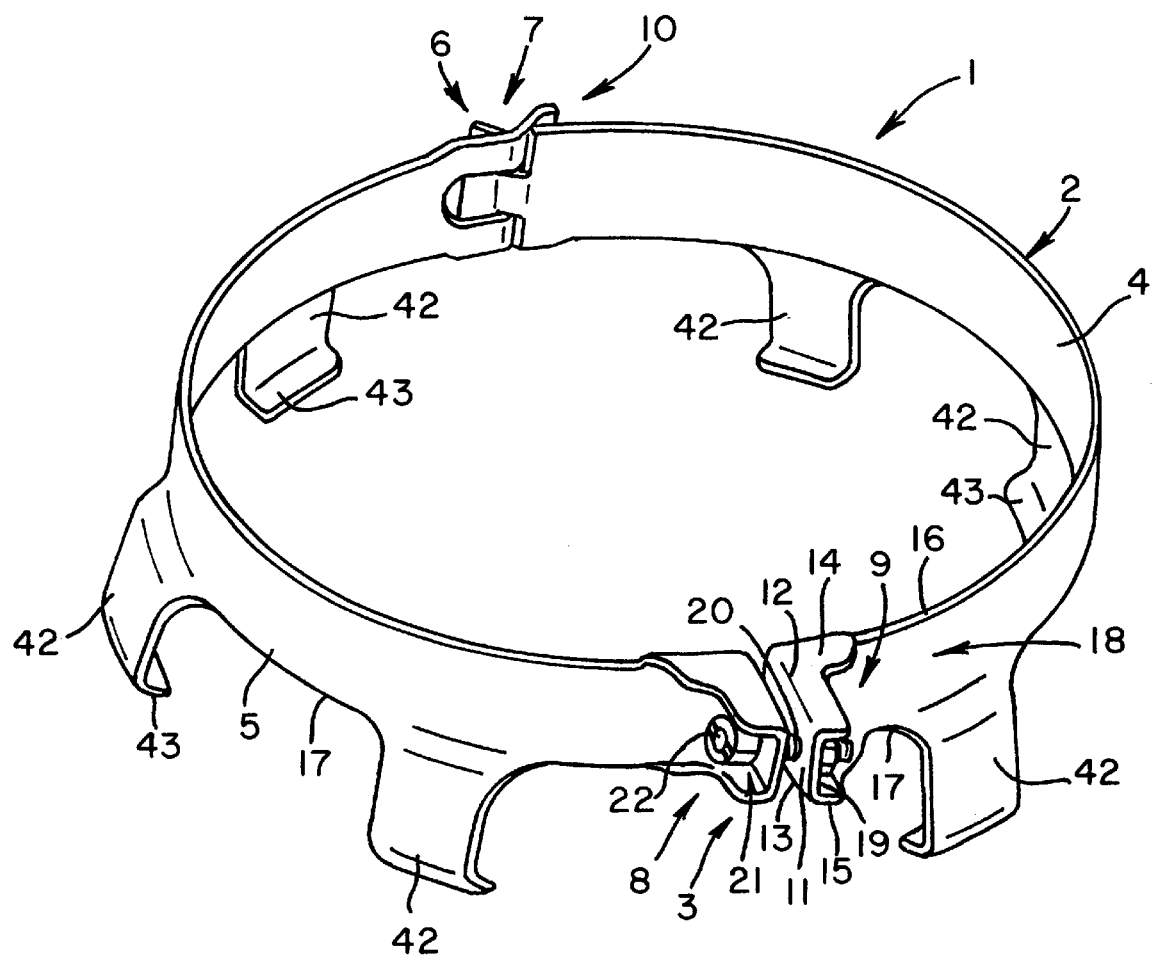
FIG. 1 shows a perspective view of a clamp.

FIG. 1 shows a clamp 1 which has a band-shaped clamping section 2 and a clamping device 3. The clamping section is divided into two semicircular parts 4 and 5. The two parts 4 and 5 are held together by means of form-locking elements in such a way that they can be unhinged or moved relative to one another. The clamping device 3 has a clamping component 8, by means of which the free diameter of the band-shaped clamping section 2 can be adjusted, so that the clamp can be firmly clamped about an object, for example, about a pipe. The two parts 4 and 5 forming the clamping section 2 are constructed identically with respect to the clamping device 3 and also with respect to further constructions described in greater detail below, so that—for the sake of simplicity—only one of the parts 4 or 5, respectively, will be discussed. However, there are differences with respect to the form-locking elements 6 and 7, so that these will be discussed separately in the following.

Each of the parts 4, 5 has a first clamping section end 9 as well as a second clamping section end 10. The clamping section end 9 is allocated to the clamping device 3 and the clamping section end 10 to the form-locking elements 6 or 7. A mounting flange 11 is formed on the clamping section end 9. Said mounting flange 11 is bent at an angle in one piece radially from part 4 and has, at its two lateral edges 12, 13, reinforcing corner connections 14, 15 joined in one piece with the mounting flange 11 and bent away from the latter at a right angle and connected, again in one piece, with the respective lateral edges 16 and 17 of the end area of the clamping section 18. Thus, the inside 19 of the mounting flange 11 lies on the base of a pocket-shaped structure which is formed by a U-section formed by the reinforcing corner connections 14 and 15 as well as the mounting flange 11. This U-section continues in the area of part 4, whereby the end area of the clamping section 18 located there forms the base of the U-section located there, more or less reaching around the corner. The mounting flange 11 is passed through by a receiving opening 20. The clamping device 3 has the clamping component 8 which is formed by a threaded screw 21, the shaft of which passes through the receiving opening 20. Since, as noted above, the end area of the clamping section 18 of part 4 is made as per the same component of part 5, the shaft of threaded screw 21 also passes through a corresponding opening in the mounting flange of part 5, whereby head 22 is supported on this mounting flange and mounting flange 11 has a screw nut 23 (see FIG. 2) which, for its part, is supported on the respective mounting flange 11. Thus, by tightening the threaded screw 21, the diameter of the clamp 1 can be varied. In particular, it can be provided that the screw nut 23 is pressed into the opening 20 with a mounting stud, so that it is held such that it cannot be lost.

The aforementioned form-locking element 6 is made in the area of the second clamping section end 10. This consists, in particular according to FIGS. 3 and 4, of a retaining projection 24 which is formed due to a T-shaped cross-section of the end area 25 of part 4. Preferably, the retaining projection 24 is produced thereby that the band-shaped part 4 receives two opposite recesses 26 open on the periphery which are produced by a punching procedure. In this way, a T-shaped leg 27 and a waist 28 are produced, whereby the waist 28 is situated between the two recesses 26. An area 29 of the clamping section 2, which is again wide, adjoins it, facing away from the end of part 4. If one follows the peripheral surface in direction of arrow 30 in FIG. 3, then it can be seen that there is an offset 31 in the area of the second clamping section end 10. This is formed thereby that the waist 28 is bent outward, toward the end, and then extends in a bent manner in the opposite direction, further toward the end, so that the plane of the T-shaped leg is staggered to the plane of area 29 of part 4. In this connection, "outward" means lying further away from the centre of the clamp 1 which, as a whole, is circular (see FIG. 1).

Furthermore, FIG. 3 shows the form-locking element 7 of part 5. This is formed by an opening 32 which is made in the shape of an oblong hole 33. The longitudinal extension of oblong hole 33 is placed in direction of the longitudinal extension of part 5. As with respect to part 4, there is also an offset in part 5 which is designated with 34. It is formed thereby that, in direction toward the end of part 4 (arrow 35), the part extends bent outward (area 36) and that there is again a bend in the opposite direction, so that a section 37 is formed. The oblong hole 33 extends up to section 37, i.e. it passes through area 36 and the area of part 5 adjacent thereto (seen in opposite direction of arrow 35).

It can be seen in FIG. 4 how the two parts 4 and 5 can be connected to one another by being hooked into one another so as to be movable by means of their form-locking elements 6 and 7. To accomplish this, part 4 is turned by 90° as per arrow 38 (FIG. 3), so that the T-shaped leg 27 can be inserted into the oblong hole 33. This is followed by untwisting, so that the illustration in FIG. 4 results. Thus, waist 28 passes through the oblong hole 33 and the end area of the T-shaped leg 27 is supported on the outer side 39 of part 5. Due to the two offsets 31 and 34, the inner sides 40 and 41 of parts 4 and 5 extend somewhat aligned to one another, i.e. an optimum positioning about a structural part to be clamped is attained. The two parts 4 and 5 are separated in a correspondingly analogous and simple manner, just as joining the two parts together.

It can be seen in FIG. 1 that essentially axially extending retaining claws 42 are made on both parts 4 and 5. The retaining claws 42 proceed from the lateral edge 17 of the respective parts 4 and 5, i.e. they are only situated on one side of the clamp 1. Preferably, they are made uniformly distributed in angle on the clamp 1 at a distance from one another. Since the clamp 1 shown in FIG. 1 has six retaining claws 42, there is an angle of 60° between each two adjacent retaining claws 42. Each retaining claw 42 is bent in the shape of a hook at its end area, so that a rear grip surface 43 is formed in each case. The retaining claws 42 are made in one piece with the respective part 4 or 5.

FIG. 5 shows how the clamp 1 is used. Two pipes 44 and 45 are shown which are axially inserted with their ends 46 and 47 into a pipe socket 48. Pipes 44 and 45 can, for example, be sewer pipes. The pipe socket 48 has an intake annular channel 49 each in the area of its two ends, in each of which an elastic gasket ring 50 is found. The latter fits tightly against the outer casing surface of the respective pipe 44 or 45. A clamp 1 is clamped onto each of the end areas 51 and 52 of the two pipes 44 and 45, i.e. each clamp 1 is firmly fixed on the corresponding outer periphery of the pipe by means of the tightened clamping component 8. The retaining claws 42 of the two clamps 1 are directed toward one another, whereby the rear grip edges 53 and 54 of the pipe socket 48 overlap. These rear grip edges 53 and 54 are formed by toroidal elevations of the pipe socket 48 which are formed due to the intake annular channels 49.

Due to the rear grip of the retaining claws 42, the two pipes 44 and 45 are connected with the pipe socket 48 so as to be axially immovable, so that a secure connection is assured, even e.g. if there is excess pressure in the pipes 44 and 45.

I claim:

1. Clamp having a band-shaped clamping section and a clamping device used to connect end areas of the clamping section which each have a mounting flange extending at an angle to the respective clamping section end area, the clamping section (2) composed of at least two parts (4,5) which are held together by form-locking elements (6,7) in such a way that the form-locking elements can be unhooked and moved, the clamping section (2) having arranged thereon essentially axially extending retaining claws (42), whereby a clamping component acts on the two mounting flanges, characterized therein that a reinforcing corner connection (14, 15) proceeds from each of two lateral edges (12, 13) of each mounting flange (11), each of said reinforcing corner connections being connected with a respective lateral edge (16, 17) of the respective end area of the adjacent clamping section (18), at least said respective reinforcing corner connections, mounting flanges and end areas being formed in one piece, said forming including the steps of punching sheet metal and implementing one or more mechanical shaping processes to said one piece of sheet metal.

2. Clamp according to claim 1, characterized therein that the clamping component (8) is a threaded screw (21) having a shaft, which shaft passes through a receiving opening (20) of the respective mounting flange (11), whose head (22) abuts one of the mounting flanges (11) and whose screw shaft is screwed into a screw nut (23) abutting the other mounting flange.

3. Clamp according to claim 1, characterized therein that one of the form-locking elements (6, 7) is formed by an opening (32) in one of the parts (4, 5) and the other form-locking element (7, 6) by a retaining projection (24) of the other part (5, 4) which can be hooked into the opening (32).

4. Clamp according to claim 3, characterized therein that the retaining projection (24) is made as one piece on the respective part (4, 5).

5. Clamp according to claim 4, characterized therein that the opening (32) is an oblong hole (33) extending in longitudinal direction of the clamping section.

6. Clamp according to claim 5, characterized therein that the retaining projection (24) is formed by a T-shaped end area (25) of the part (4).

7. Clamp according to claim 1, characterized therein that the retaining claws (42) are made as one piece with the clamping section (2).

8. Clamp according to claim 7, characterized therein that the retaining claws (42) proceed from only one side of the clamping section (2).

9. Pipe connection having two pipes (44, 45), axially inserted into a pipe socket (48), whereby a clamp (1) each is clamped onto the pipes (44, 45), according to claim 8, and the retaining claws (42) axially grip behind rear grip edges (53, 54) of the pipe socket (48).

\* \* \* \* \*

UNITED STATES PATENT AND TRADEMARK OFFICE
CERTIFICATE OF CORRECTION

PATENT NO. : 5,842,725
DATED : December 1, 1998
INVENTOR(S) : Kurt ALLERT

It is certified that error appears in the above-identified patent and that said Letters Patent is hereby corrected as shown below:

On the title page, item [73] Assignee , Please change "Kurt Allert GmbH & Co. KG., Oberndorf, Germany". to --Hans Oetiker AG Maschinen- und Apparatefabrik--.

Signed and Sealed this

First Day of February, 2000

Attest:

Q. TODD DICKINSON

Attesting Officer

Acting Commissioner of Patents and Trademarks